(12) United States Patent
Bookbinder et al.

(10) Patent No.: US 9,193,625 B2
(45) Date of Patent: Nov. 24, 2015

(54) GLASS WITH SURFACE AND CENTRAL REGIONS UNDER COMPRESSION

(75) Inventors: Dana Craig Bookbinder, Corning, NY (US); Timothy Michael Gross, Waverly, NY (US)

(73) Assignee: Corning Incorporated, Corning, NY (US)

( * ) Notice: Subject to any disclaimer, the term of this patent is extended or adjusted under 35 U.S.C. 154(b) by 27 days.

(21) Appl. No.: 13/989,585

(22) PCT Filed: Nov. 29, 2011

(86) PCT No.: PCT/US2011/062354
§ 371 (c)(1),
(2), (4) Date: May 24, 2013

(87) PCT Pub. No.: WO2012/074983
PCT Pub. Date: Jun. 7, 2012

(65) Prior Publication Data
US 2013/0236666 A1  Sep. 12, 2013

Related U.S. Application Data

(60) Provisional application No. 61/417,935, filed on Nov. 30, 2010.

(51) Int. Cl.
| | | |
|---|---|---|
| C03C 21/00 | (2006.01) | |
| B32B 17/00 | (2006.01) | |
| B32B 17/10 | (2006.01) | |
| C03C 3/083 | (2006.01) | |
| C03B 23/203 | (2006.01) | |

(52) U.S. Cl.
CPC ......... *C03C 21/002* (2013.01); *B32B 17/10045* (2013.01); *B32B 17/10137* (2013.01); *C03C 3/083* (2013.01); *C03B 23/203* (2013.01); *Y10T 428/131* (2015.01); *Y10T 428/24992* (2015.01)

(58) Field of Classification Search
None
See application file for complete search history.

(56) References Cited

U.S. PATENT DOCUMENTS 1,960,121 A * 5/1934 Moulton ................. 428/410
3,107,196 A * 10/1963 Acloque ................. 428/332
(Continued)

FOREIGN PATENT DOCUMENTS

| AU | 64522/65 | 9/1965 |
| EP | 2397449 | 12/2011 |

(Continued)

OTHER PUBLICATIONS

International Searching Authority; International Search Report; Mailing Date: Mar. 15, 2012; pp. 1-4.
(Continued)

*Primary Examiner* — David Sample
(74) *Attorney, Agent, or Firm* — Robert P. Santandrea (57) ABSTRACT

A glass article having an engineered stress profile. The central or core region of the glass is in compression and the surface or outer region of the glass is either under neutral stress or in compression. The outer surface region and the core region are separated by an intermediate region that is under tension. A flaw that penetrates the outer region in compression will propagate in the underlying tensile intermediate layer, but will not penetrate though the compressive core region of the glass. The compressive core region prevents flaws from penetrating through the thickness of the glass.

60 Claims, 8 Drawing Sheets

(56) References Cited

U.S. PATENT DOCUMENTS

| | | | |
|---|---|---|---|
| 3,357,876 A * | 12/1967 | Rinehart | 428/410 |
| 3,673,049 A * | 6/1972 | Giffen et al. | 428/213 |
| 3,737,294 A | 6/1973 | Dumbaugh, Jr. et al. | |
| 3,746,526 A * | 7/1973 | Giffon | 65/121 |
| 3,765,855 A * | 10/1973 | Larrick | 65/30.14 |
| 3,849,097 A | 11/1974 | Giffen et al. | |
| 3,931,438 A | 1/1976 | Beall et al. | |
| 3,958,052 A * | 5/1976 | Galusha et al. | 428/68 |
| 4,102,664 A | 7/1978 | Dumbaugh, Jr. | |
| 4,214,886 A | 7/1980 | Shay et al. | |
| 5,342,426 A | 8/1994 | Dumbaugh, Jr. | |
| 5,559,060 A | 9/1996 | Dumbaugh, Jr. et al. | |
| 7,514,149 B2 | 4/2009 | Bocko et al. | |
| 8,007,913 B2 | 8/2011 | Coppola et al. | |
| 2006/0127679 A1 * | 6/2006 | Gulati et al. | 428/426 |
| 2007/0218262 A1 * | 9/2007 | Degand et al. | 428/215 |
| 2008/0286548 A1 * | 11/2008 | Ellison et al. | 428/220 |
| 2009/0142568 A1 | 6/2009 | Dejneka et al. | 428/220 |
| 2010/0009154 A1 | 1/2010 | Allan et al. | 428/220 |
| 2010/0035038 A1 | 2/2010 | Barefoot et al. | 428/220 |
| 2010/0190038 A1 | 7/2010 | Osakabe et al. | 428/846.2 |
| 2011/0200804 A1 * | 8/2011 | Tomamoto et al. | 428/213 |
| 2012/0048604 A1 * | 3/2012 | Cornejo et al. | 174/258 |
| 2014/0093702 A1 * | 4/2014 | Kitajima | 428/174 |

FOREIGN PATENT DOCUMENTS

| | | |
|---|---|---|
| EP | 2540682 | 1/2013 |
| GB | 1012367 | 9/1963 |
| JP | 2004-259402 | 9/2004 |
| WO | 2010/005578 | 1/2010 |
| WO | 2010/016928 | 2/2010 |
| WO | 2011/149811 | 12/2011 |
| WO | 2011/149812 | 12/2011 |
| WO | 2012/027660 | 3/2012 |

OTHER PUBLICATIONS

Varshneya; "Fundamentals of Inorganic Glass, Strengthening and Toughening"; Jan. 1, 2006; Fundamentals of Inorganic Glasses, San Diego, CA: Academic Press, US; pp. 513-521.

2nd Chinese Office Action (English translation), dated May 18, 2015, pp. 1-5, Chinese Application No. 201180066244.4, The State Intellectual Property Office of the People's Republic of China.

1st Chinese Office Action (English translation) dated Jul. 8, 2014, pp. 1-9, Chinese Application No. 201180066244.4, The State Intellectual Property Office of the People's Republic of China.

European Office Action, dated Jun. 3, 2015, pp. 1-6, European Application No. 11802990.9, European Patent Office, Munich, Germany.

International Search Report and Written Opinion, dated Mar. 15, 2012, International Application No. PCT/US2011/062354, International Filing Date Nov. 29, 2011, 1-26.

* cited by examiner

GLASS WITH SURFACE AND CENTRAL REGIONS UNDER COMPRESSION

CROSS-REFERENCE TO RELATED APPLICATIONS

This application claims the benefit of priority under 35 U.S.C. §119 of U.S. Provisional Application Ser. No. 61/417,935 filed on Nov. 30, 2010, the content of which is relied upon and incorporated herein by reference in its entirety.

BACKGROUND

The disclosure relates to damage-resistant glasses and methods of making such glasses. More particularly, the disclosure relates to damage-resistant glasses having a central core region that is under compression.

Glasses are sometimes provided with stress profiles that provide damage resistance upon impact by chemical or thermal strengthening or by lamination of glasses. The surface layer of the glass is typically placed in compression, while the bulk interior of the glass put into tension.

SUMMARY

A glass article having an engineered stress profile is provided. The central or core region of the glass is in compression and the surface or outer region of the glass is either under neutral stress or in compression. The outer surface region and the core region are separated by an intermediate region that is under tension. A flaw that penetrates the outer region in compression will propagate into the underlying tensile intermediate layer, but will not penetrate though the thickness of the glass since the flaw is blocked, or deflected by the compressive core region of the glass. The compressive core region prevents flaws from penetrating through the thickness of the glass. This stress profile provides internal anti-splinter capability.

Accordingly, one aspect of the disclosure is to provide a glass article. The glass article comprises: an outer region extending from the surface of the glass to a depth of layer, wherein the outer region is under either a neutral stress or a first compressive stress; a core region under a second compressive stress; and an intermediate region disposed between the surface and the core region, wherein the intermediate region is under a tensile stress.

A second aspect of the disclosure is to provide a glass article having a laminate structure. The laminate structure comprises: an outer region extending from a surface of the glass article to a depth of layer, wherein the outer region is under either a neutral stress or a first compressive stress; a core region under a second compressive stress; and an intermediate region disposed between the outer region and the core region, wherein the intermediate region is under a tensile stress.

A third aspect of the disclosure is to provide a method of making a crack-resistant glass article. The method comprises the steps of: providing a glass article having a core region, a surface region, and an intermediate region disposed between the surface region and the core region; and creating a compressive stress in the core region and a tensile stress in the intermediate region, wherein the compressive stress prevents, limits, or at least partially deflects the propagation of cracks from the intermediate region through the core region.

These and other aspects, advantages, and salient features will become apparent from the following detailed description, the accompanying drawings, and the appended claims.

BRIEF DESCRIPTION OF THE DRAWINGS

FIG. 1b is a stress profile of the strengthened glass sheet shown in FIG. 1a;

FIG. 2b is a schematic representation of a stress profile of the strengthened glass sheet shown in FIG. 2a;

DETAILED DESCRIPTION

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range. As used herein, the indefinite articles "a," "an," and the corresponding definite article "the" mean "at least one" or "one or more," unless otherwise specified.

As used herein, the terms "alkali metal" and alkali metal ions" are, unless otherwise specified, considered to be equivalent terms, and are used interchangeably.

Figure 1A:
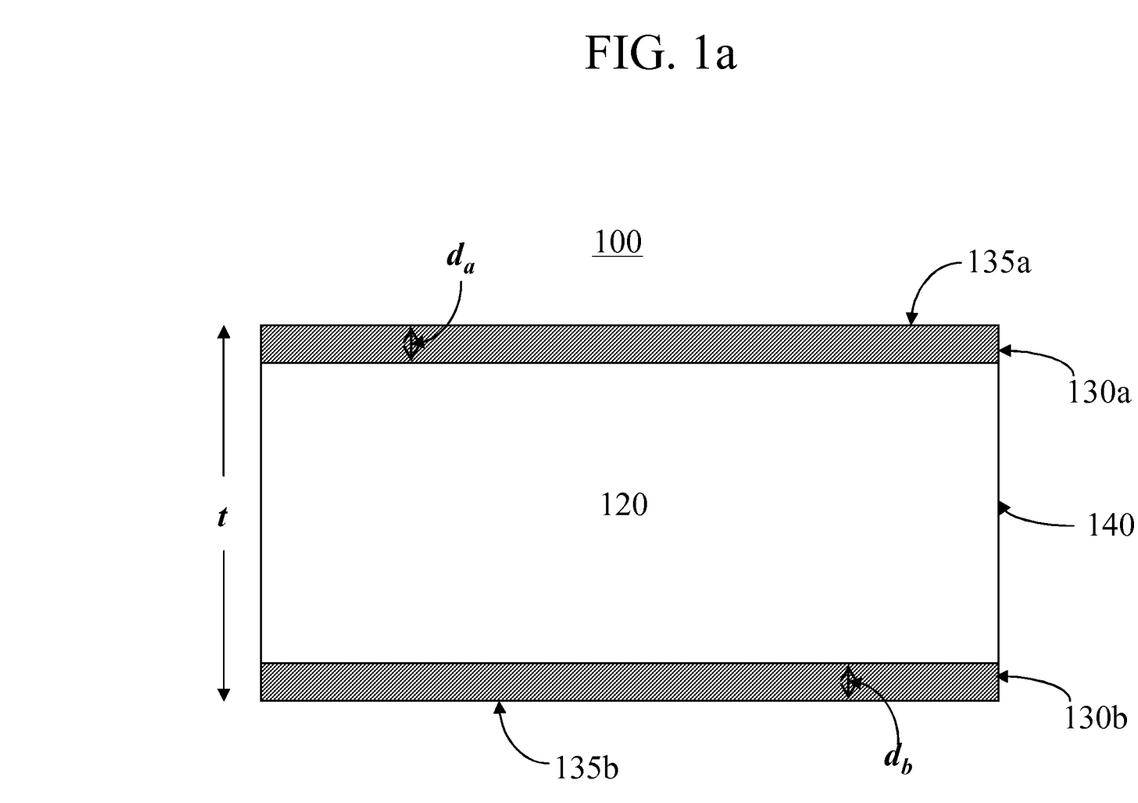
FIG. 1a is a schematic representation of a cross-sectional view of a strengthened glass sheet.
Figure 1B:
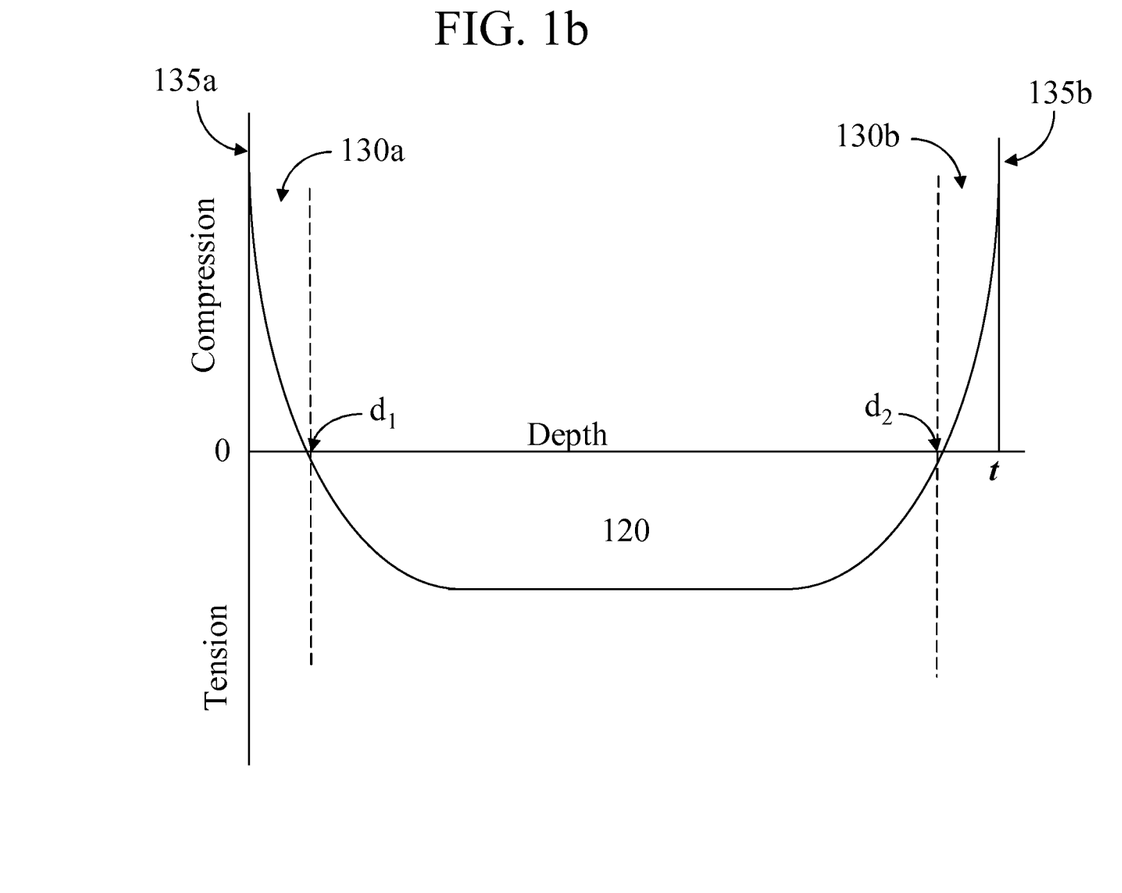

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

A cross-sectional view of a glass sheet that is strengthened by either chemical or thermal means and having thickness t is schematically shown in FIG. 1a. The corresponding stress profile of glass sheet 100 is schematically shown in FIG. 1b. Glass sheet 100 has surfaces 135a and 135b that are joined by at least one edge 140. Strengthened regions (also referred to as compressive layers) 130a and 130b are under compressive stress (in compression) and extend from surfaces 135a and 135b to depths of layer $d_1$ and $d_2$, respectively. The remaining interior region of glass sheet (120 in FIG. 1a) is under tension (tensile stress). If a flaw penetrates one of strengthened regions 130a or 130b, it will propagate through the entire thickness of glass sheet 100 and cause catastrophic failure of glass sheet 100.

The present disclosure provides a crack-resistant glass article having a surface, an outer region extending from a surface of the article to a depth of layer, wherein the outer region is under either a neutral or zero stress or a compressive stress, a core region that is under compression, and an intermediate region between the outer region and the core region, wherein the intermediate region is under a tensile stress. As defined herein, the core region is in compression relative to the intermediate region; i.e., the core region may be under compression with respect to a neutral stress or have less tension than the intermediate region.

When the outer region is in compression, the formation of flaws due to contact events (e.g., impact) is prevented. If a crack or flaw penetrates the outer region, they may propagate through the intermediate region but are limited, or at least partially blocked or deflected by the compressive core region.

Figure 2A:
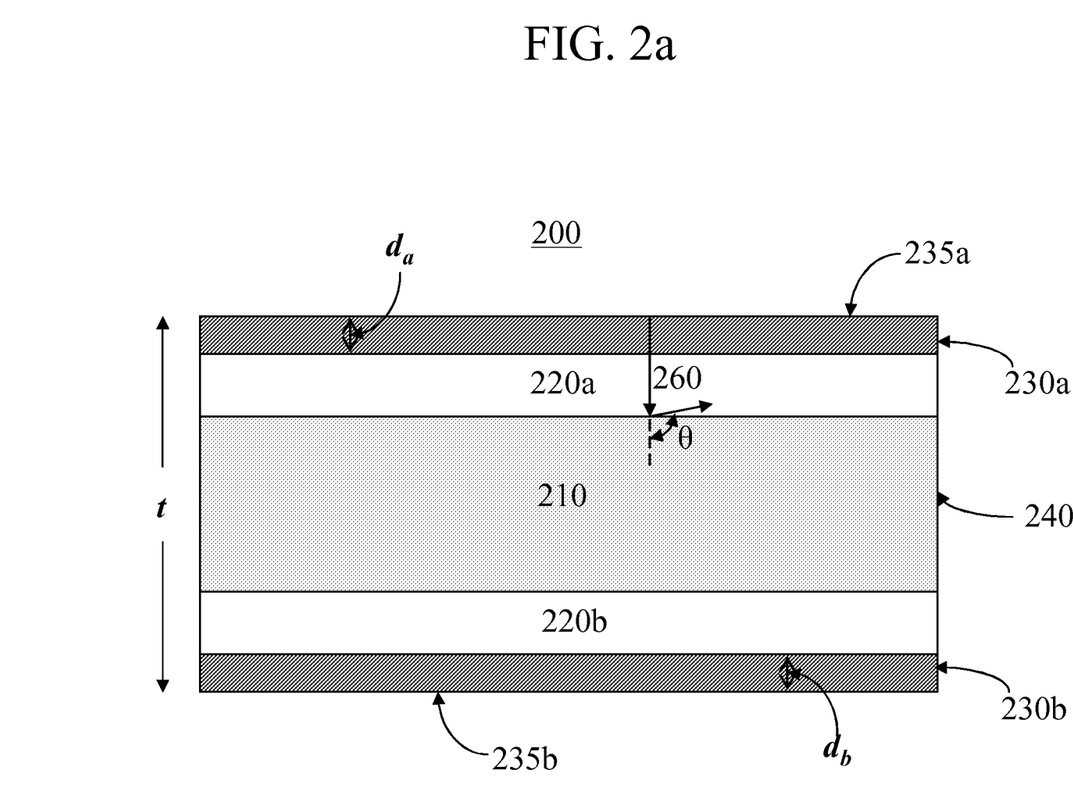
FIG. 2a is a schematic representation of a cross-sectional view of a glass article having a central region under compression, intermediate regions under tension, and outer regions that under compression.
Figure 2B:
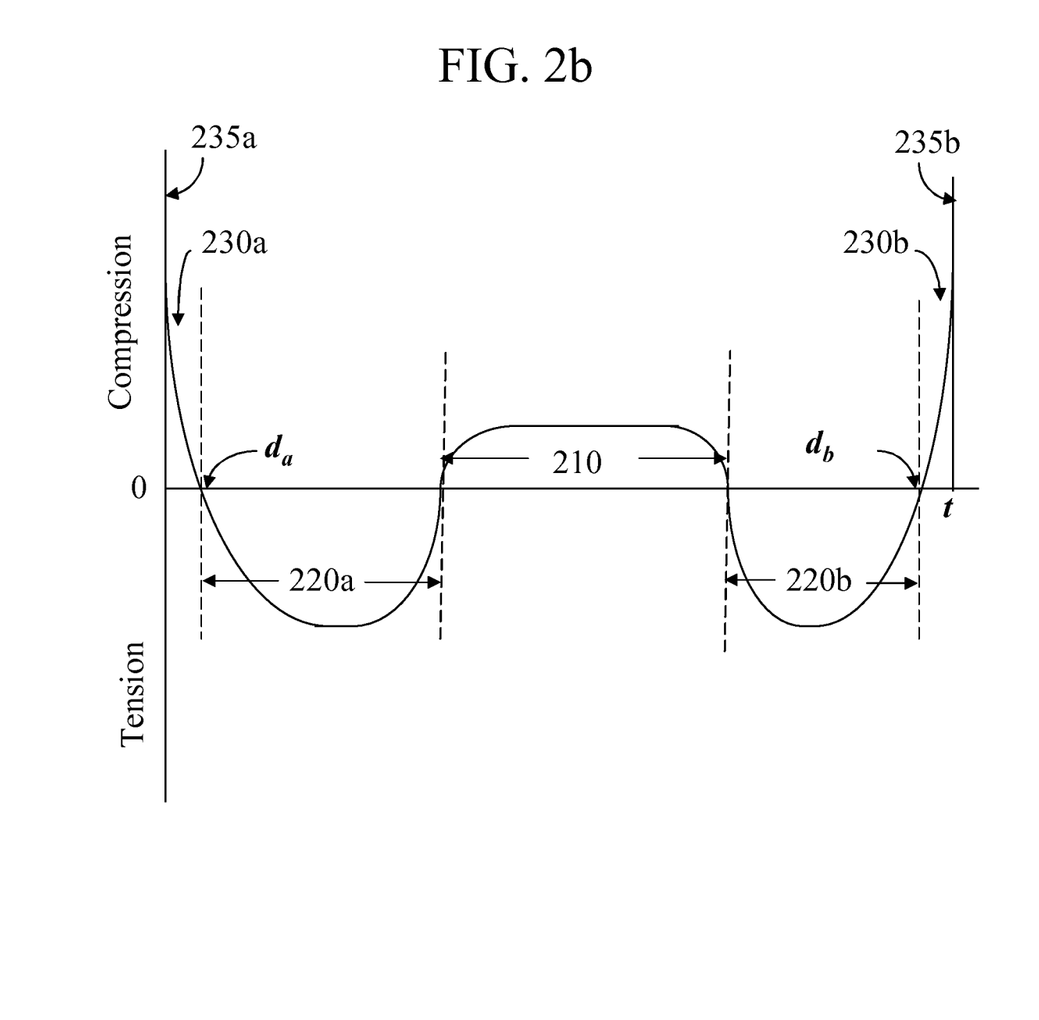

A cross-section and stress profile of a glass article having a central region under compression, intermediate regions under tension, and outer regions that under compression are schematically shown in FIGS. 2a and 2b, respectively. Glass article 200 of thickness t has a central or core region 210 that is under compressive stress, and outer regions 230a, 230b under a compressive stress. The compressive stresses in outer regions 230a and 230b may or may not be substantially equal to each other. Outer regions 230a, 230b are joined to each other by at least one edge 240, which may be polished, etched, or otherwise strengthened. The compressive stress of core region 210 may, in some embodiments, differ in value from the compressive stress of outer regions 230a and 230b. In some embodiments, core region 210 is located at or near the mid-point between opposite surfaces 230a, 230b. In some embodiments, one, or both of outer regions 230a, 230b is under a neutral or zero stress—i.e., they are in neither tension nor compression. It is understood that the magnitude of the compressive stresses in strengthened regions 230a, 230b may or may not be substantially equal to each other. Outer regions 230a, 230b extend from surfaces 235a, 235b to depths of layer $d_a$, $d_b$, respectively. Intermediate regions 220a, 220b are in tension and located between compressive core region 210 and outer regions 230a, 230b. The tensile stresses in intermediate regions 220a and 220b may or may not be substantially equal to each other. In some embodiments, the stress profile for glass article 200 is one in which the surface or outer regions 230a, 230b and the core region 210 are both under high compression, which leads to high Vickers crack initiation loads at the surface and enhanced crack deflection in the core region. In some embodiments, the Vickers crack initiation threshold of the surface/outer region is at least about 5000 gf (gram force). In some embodiments, surface/outer regions 230a, 230b each have a compressive stress of at least 500 MPa, as determined by photoelastic methods that are known in the art. Such photoelastic methods measure birefringence due to residual stress in the glass. The depth of layer of outer region 230 is at least 5 microns (µm). In some embodiments, the depth of layer of outer region 230 is at least 10 µm and, in other embodiments, at least 20 µm. The Vickers indenter that is used to measure crack initiation is known in the art and described, for example, in pages 130-132 of "Materials Science and Engineering (third edition)" by William D. Callister (John Wiley & Sons, New York, 1994), which are incorporated by reference herein. If a crack or flaw 260 penetrates outer regions 230a, 230b and/or intermediate regions 220a, 220b, core region 210 blocks or deflects blocks the crack and/or flaw 260 by an angle θ. In some embodiments, core region 210 deflects such cracks and/or flaws to propagate laterally to the surface. In some embodiments, core region 210 deflects such cracks and/or flaws propagating through the intermediate layer to propagate laterally to the surface without changing their orientation with respect to the surface. For example, the crack and/or flaw penetrates the outer region at a 90° angle perpendicular to the surface, the core region blocks or deflects the crack and/or flaw, the crack and/or flaw then propagates along the surface plane at the same or similar angle in relation to the surface (See FIG. 6, indent cracks 655). In other embodiments the core region 210 deflects cracks and/or flaws 260 propagate through the intermediate layer by at least 45° and, in other embodiments, by at least 90° to the initial angle of formation relative to the surface. For example, the crack and/or flaw penetrates the outer region at a 90° angle perpendicular to the surface, the core region blocks or deflects the crack and/or flaw, the crack and/or flaw then deflects by 90° and propagates along the surface plane parallel to the surface (i.e., subsurface along the interface between region 220 and 210). Unless otherwise specified, the Vickers indentation cracking threshold measurements described herein were performed by applying and then removing an indentation load to the glass surface at a rate of 0.2 mm/min. The maximum indentation load was held for 10 seconds. The indentation cracking threshold was defined at the indentation load at which 50% of 10 indents exhibited any number of radial/median cracks emanating from the corners of the indent impression. The maximum load was increased until the threshold was met for a given glass composition. All indentation measurements were performed at room temperature in 50% relative humidity.

In some embodiments, core region 210, intermediate regions 220a, 220b and outer regions 230a, 230b of glass article 200 are formed by a laminate structure (laminate) comprising multiple glass sheets or layers of like or different compositions. The glass sheets or layers are in direct contact with each other; i.e., are not separated by non-glass materials such as organic polymeric layers or adhesives. Such laminates may be formed by contacting the multiple sheets with each other under temperature and pressure conditions that cause the sheets to fuse or otherwise bond together to form the laminate structure, by redrawing, or by other lamination methods that are known in the art. In some embodiments, the individual glasses comprising the laminate differ in composition from each other. In some embodiments, at least a portion of the glasses comprising the laminate are ion exchangeable. Alternatively, such laminates may include glasses that are not ion exchangeable. For example, the glass forming core region 210 in the laminate may be a glass that is not ion exchangeable.

In some embodiments, the laminate structure comprises five layers of such glasses through thickness t of glass article, wherein the five layers correspond to core region 210, intermediate regions 220a, 220b and outer regions 230a, 230b. The layers of glass have alternating high and low coefficients of thermal expansion (CTEs). Glasses having low CTEs are located at outer regions 230a, 230b, which are located at surfaces 235a, 235b, respectively, and in core region 210 of the glass article 200, while glasses having higher CTEs form intermediate regions 220a, 220b, which are sandwiched between lower CTE glasses of core region 210 and outer regions 220a or 220b, respectively. In order to achieve greater numbers of alternating compressive and tensile layers, the laminate structure, in some embodiments, may comprise greater than five layers.

In some embodiments, compression may be achieved in outer regions 230a, 230b and core region 210 by a laminate structure in which a "core" glass (310 in FIG. 3) containing an alkali metal ion $m_a^+$ is laminated or encapsulated inside an outer layer or "skin" glass containing an alkali metal ion $m_b^+$ (330 in FIG. 3) having an ionic radius that is less than that of $m_a^+$. In some embodiments, the larger and smaller alkali ions $m_a^+$, $m_b^+$ contained in the core glass 310 and the skin glass 330a, 330b, respectively, may be chosen such that there is an intermediate size alkali metal ion $m_c^+$ having an ionic radius that is between those of larger and smaller alkali metal ions $m_a^+$, $m_b^+$; i.e., $m_a^+>m_c^+>m_b^+$. Possible combinations of alkali metal ions that satisfy this relationship and may therefore be used in this embodiment are listed in Table 1. The intermediate alkali metal ion $m_c^+$ will exchange with the smaller alkali ion $m_b^+$ in the skin glass 330, 330b to place surfaces 235a, 235b in compression and thus form outer regions 230a, 230b. The intermediate alkali metal ion $m_c^+$ will also penetrate through the skin glass 330a, 330b into a portion of the core glass 310 and exchange with the larger alkali metal ion $m_a^+$ in the core glass 310 to create tensile intermediate regions 220a, 220b. The concentration profile of alkali metal ion $m_c^+$ across each glass region can be mathematically approximated by a complementary error function $C(z)=C_{min}+(C_{\_surf}-C_{m}n) \cdot \mathrm{erfc}(z/A)$, where C is the concentration of the alkali metal ion $m_c^+$, z is the distance from the outer surface (235a, 235b), $C_{min}$ is the minimum bulk concentration of the alkali metal ion $m_c^+$, $C_{surf}$ is the maximum surface concentration of the alkali metal ion $m_c^+$, and A is a constant. Penetration of alkali metal ion $m_c^+$ into core glass 310 can be controlled, for example, by limiting the time period allowed for ion exchange. The portion of the core glass 310 in which such ion exchange does not occur will be put into compression so as to balance the stresses within glass article 200, thus creating core region 210.

TABLE 1

Combinations of alkali metal ions $m_a^+$, $m_b^+$, $m_c^+$ that satisfy the relationship $m_a^+ > m_c^+ > m_b^+$.

| $m_a^+$ | $m_b^+$ | $m_c^+$ |
|---------|---------|---------|
| Cs⁺ | K⁺ | Rb⁺ |
| Cs⁺ | Na⁺ | Rb⁺, K⁺ |
| Cs⁺ | Li⁺ | Rb⁺, K⁺, Na⁺ |
| Rb⁺ | Na⁺ | K⁺ |
| Rb⁺ | Li⁺ | K⁺, Na⁺ |
| K⁺ | Li⁺ | Na⁺ |

In another embodiment, ion exchange across interfaces in the laminate may be used to create additional compressive and tensile layers within the glass article 200. The laminate comprises an ion exchangeable "skin" (e.g., an alkali aluminosilicate glass) containing an alkali metal ion $m_d^+$, such as sodium (Na⁺), as its primary alkali metal ion and a "core" glass having a larger alkali metal ion $m_e^+$ (e.g., K⁺, Rb⁺, or Cs⁺) as its primary alkali metal ion. Ion-exchange of the skin glass alkali with larger alkali $m_f^+$ from salt bath (e.g., 100% KNO₃ where $m_d^+$=Na⁺ and $m_f^+$=K⁺) would put the skin glass in high surface compression. Alkali salt bath ions, $m_f^+$ do not penetrate through the skin layers during ion-exchange. During this ion-exchange process, the alkali metal ions $m_e^+$ that are already present in the core and alkali ions $m_d^+$ that are already present in the skin glasses will undergo ion-exchange at the laminate interface. The ion exchange occurring at the laminate interface places the skin glass at the laminate interface in compression and the core glass at the laminate interface in tension. This profile would consist of a skin with compression at the surfaces, at the laminate interfaces, and in the core, resulting in five compressive layers within the laminate. Alkali metal ions $m_e^+$ and $m_f^+$ are larger than (i.e., each have ionic radii greater than) alkali metal ion $m_d^+$; i.e., $m_e^+>m_d^+$ and $m_f^+>m_d^+$. In some embodiments, the ionic radius of $m_e^+$ is larger than or equal to that of $m_f^+$ and the ionic radii of both $m_e^+$ and $m_f^+$ are both greater than that of $m_d^+$. Penetration of alkali metal ion $m_f^+$ into the skin glass can be controlled, for example, by limiting the time period allowed for ion exchange.

TABLE 2

Combinations of alkali metal ions $m_d^+$, $m_e^+$, $m_f^+$ that satisfy the relationship $m_e^+ > m_d^+$ and $m_f^+ > m_d^+$.

| $m_e^+$ | $m_d^+$ | $m_f^+$ |
|---------|---------|---------|
| Cs⁺ | K⁺ | Cs⁺, Rb⁺ |
| Cs⁺ | Na⁺ | Cs⁺, Rb⁺, K⁺ |
| Cs⁺ | Li⁺ | Cs⁺, Rb⁺, K⁺, Na⁺ |
| Rb⁺ | Na⁺ | Cs⁺, Rb⁺, K⁺ |
| Rb⁺ | Li⁺ | Cs⁺, Rb⁺, K⁺, Na⁺ |
| K⁺ | Na⁺ | Cs⁺, Rb⁺, K⁺ |
| K⁺ | Li⁺ | Cs⁺, Rb⁺, K⁺, Na⁺ |
| Rb⁺ | K⁺ | Rb⁺, Cs⁺ |

In other embodiments, glass article 200 is an ion exchangeable monolithic glass in which outer regions 230a, 230b and core region 210 of glass article 200 are formed by ion exchange. Glass article 200 may be a sheet formed by methods such as down-draw methods, including slot-draw and fusion-draw methods; crucible melting; float methods; casting, molding; or the like. In this process, a glass article containing primarily a first metal ion (e.g., alkali cations in Li₂O, Na₂O, etc.) is at least partially immersed in or otherwise contacted with an ion exchange bath or medium containing a second metal ion that is either larger or smaller than the first metal ion that is present in the glass. The first metal ions diffuse from the glass surface into the ion exchange bath/medium (e.g., a past or gel) while the second metal ions from the ion exchange bath/medium replace the first metal ions in the glass surface. The substitution of larger ions for smaller ions in the glass creates a compressive stress at the glass surface, whereas substitution of smaller ions for larger ions in the glass creates a tensile stress at the surface of the glass. In some embodiments, the first metal ion and second metal ion are monovalent alkali metal ions. However, other monovalent metal ions such as Ag⁺, Tl⁺, Cu⁺, and the like may be used in the ion exchange process.

Compression in core region 210 and outer regions 230a, 230b and tension in intermediate regions 220a, 220b may, in some embodiments, be achieved by "mixed" ion exchange of a glass. The glass article, which comprises a metal ion m⁺, is at least partially immersed in or otherwise contacted with a "mixed' ion exchange bath or medium containing a first metal ion $m_1^+$ having an ionic radius that is smaller than that of the metal ion in the glass and a second metal ion $m_2^+$ having an ionic radius that is larger than that of the metal ion m⁺ in the glass. The concentration of the larger metal ions $m_2^+$ in the mixed ion exchange bath or medium is greater than that of the smaller alkali metal ion $m_1^+$ in the bath or medium.

Figure 4:
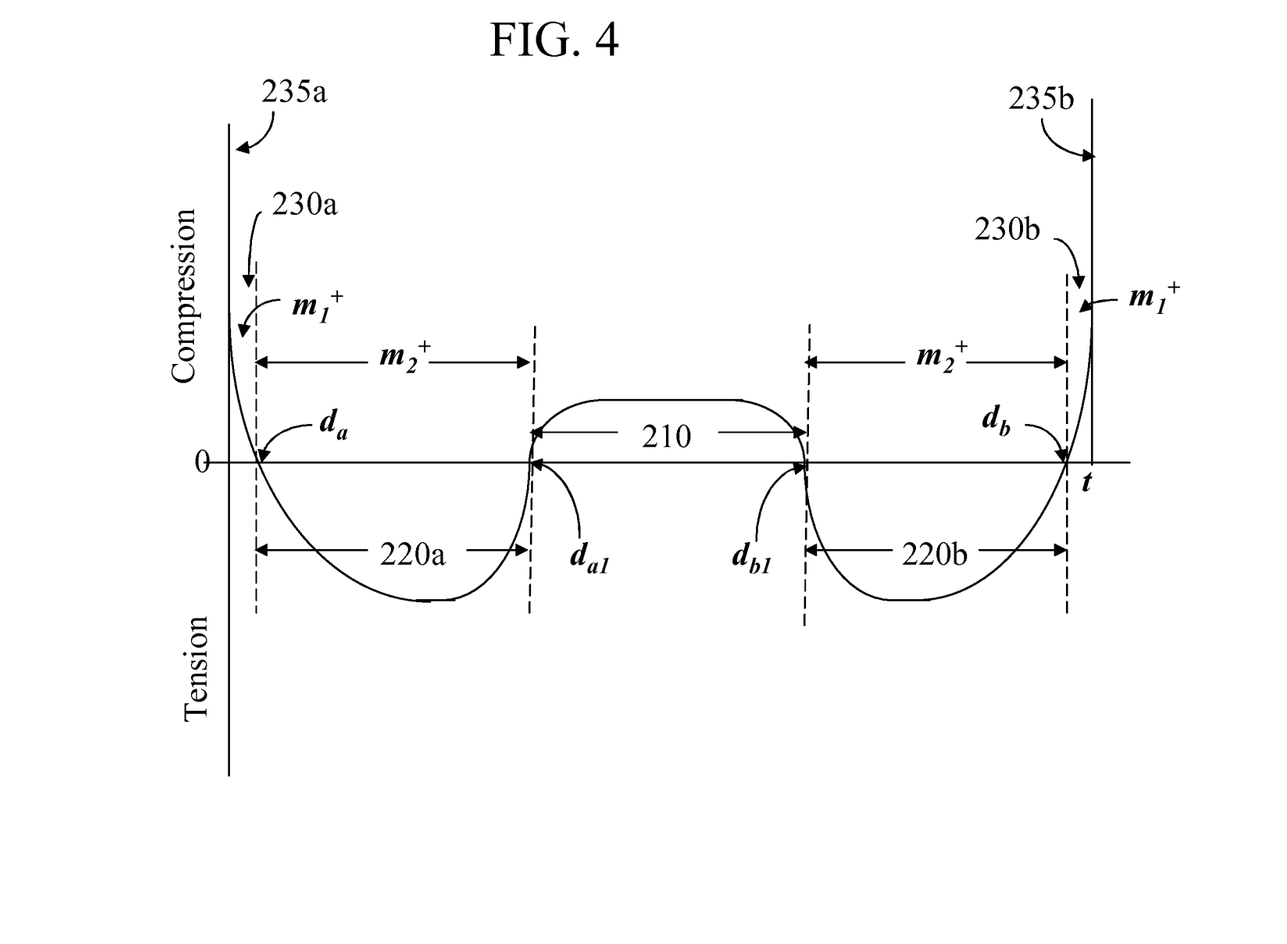
FIG. 4 is a stress profile of a cross-sectional view of a glass article strengthened by mixed ion exchange.

Outer regions 230a, 230b are formed by exchange of the larger metal ion $m_2^+$ provided by the ion exchange bath or medium with the metal ion m⁺ in the glass article 200 to depths $d_a$, $d_b$, respectively (FIG. 4). The exchange of larger ions $m_2^+$ for metal ions m⁺ in the glass creates compression in outer regions 230a, 230b. Compression in regions 230a, 230b is ensured by maintaining the concentration of the larger ions $m_2^+$ at a level that is greater than that of the smaller metal ions $m_1^+$ in the ion exchange bath or medium. The larger metal ion $m_2^+$ is less mobile than the smaller metal ion $m_1^+$. Consequently, the exchange of the larger metal ion $m_2^+$ for metal ion $m^+$ in glass article 200 is limited to outer regions 230a, 230b of glass article 200.

Intermediate regions 220a, 220b are formed by ion exchange of the smaller metal ion $m_1^+$ for metal ion $m^+$ in glass article 200 to depths $d_{a1}$, $d_{b1}$, respectively (FIG. 4). Intermediate regions 220a, 220b extend from depths $d_a$, $d_b$, to depths $d_{a1}$, $d_{b1}$, respectively. The greater mobility of the smaller metal ions $m_1^+$ allows them to penetrate more deeply into the glass article 200. The exchange of smaller metal ions $m_1^+$ for the metal ions $m^+$ in the glass creates intermediate regions 220a, 220b under tension beneath the compressive outer regions 230a, 230b formed at surfaces 235a, 235b by exchange of the larger metal ion $m_2^+$ for metal ions $m^+$.

Figure 3:
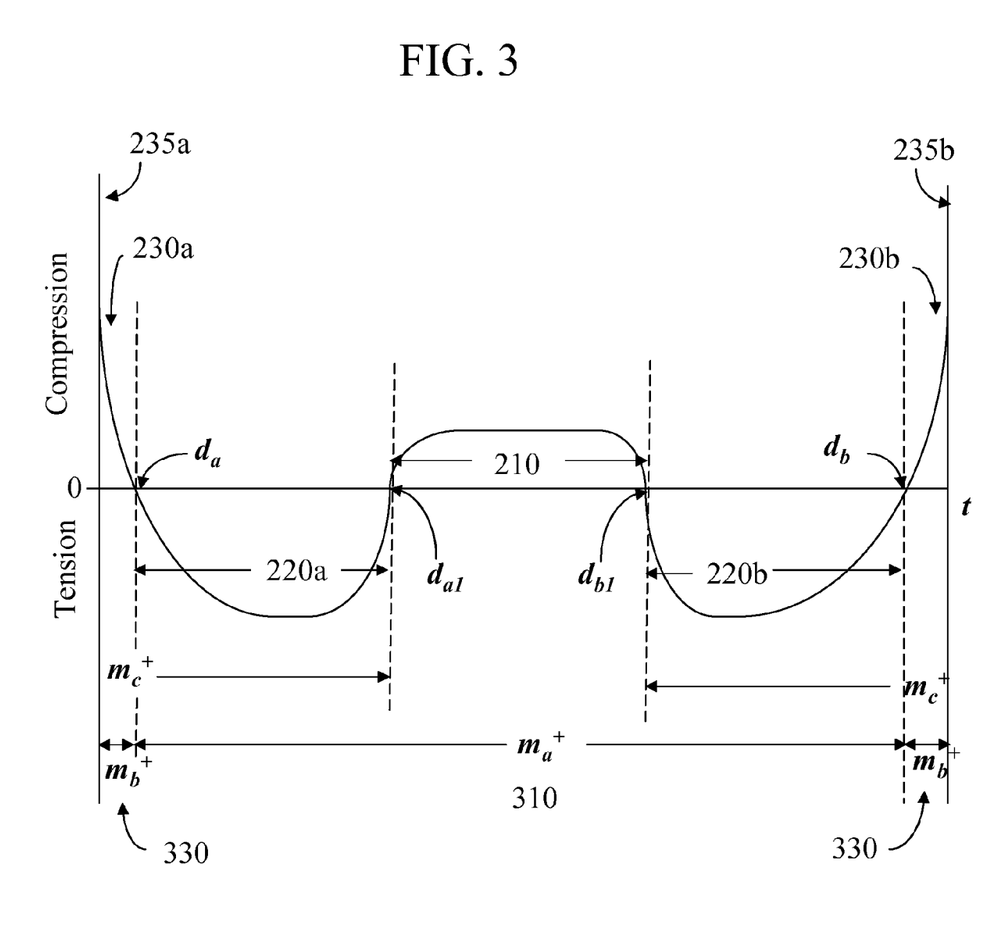
FIG. 3 is a schematic representation of a cross-sectional view of stress and concentration profiles of a strengthened glass article having a laminate structure.

Rather than extending through the entire depth of glass article 200, exchange of smaller metal ion $m_1^+$ for metal ion $m^+$ in glass article 200 is limited to depths $d_{a1}$, $d_{b1}$ of glass article 200. Consequently, compressive core region 210 is created at depths greater than $d_{a1}$, $d_{b1}$ as a result of the ion exchange process to counteract the tensile stress in adjacent intermediate regions 220a, 220b. Penetration of alkali metal ion $m_1^+$ into core glass 310 can be controlled, for example, by limiting the time period allowed for ion exchange.

In some embodiments, glass article 200 comprises a soda lime glass. In other embodiments, glass article comprises an alkali aluminosilicate glass, an alkali aluminoborosilicate glass, or combinations thereof. In one embodiment, the alkali aluminosilicate glass comprises alumina, at least one alkali metal and, in some embodiments, greater than 50 mol %, $SiO_2$, in other embodiments, at least 58 mol %, and in still other embodiments, at least 60 mol % $SiO_2$, wherein the ratio $$\frac{Al_2O_3(\text{mol \%}) + B_2O_3(\text{mol \%})}{\sum \text{alkali metal modifiers (mol \%)}} > 1,$$

where the modifiers are alkali metal oxides. This glass, in particular embodiments, comprises, consists essentially of, or consists of: about 58 mol % to about 72 mol % $SiO_2$; about 9 mol % to about 17 mol % $Al_2O_3$; about 2 mol % to about 12 mol % $B_2O_3$; about 8 mol % to about 16 mol % $Na_2O$; and 0 mol % to about 4 mol % $K_2O$, wherein the ratio $$\frac{Al_2O_3(\text{mol \%}) + B_2O_3(\text{mol \%})}{\sum \text{alkali metal modifiers (mol \%)}} > 1,$$

where the modifiers are alkali metal oxides. In another embodiment, the alkali aluminosilicate glass comprises, consists essentially of, or consists of: about 61 mol % to about 75 mol % $SiO_2$; about 7 mol % to about 15 mol % $Al_2O_3$; 0 mol % to about 12 mol % $B_2O_3$; about 9 mol % to about 21 mol % $Na_2O$; 0 mol % to about 4 mol % $K_2O$; 0 mol % to about 7 mol % MgO; and 0 mol % to about 3 mol % CaO. In yet another embodiment, the alkali aluminosilicate glass comprises, consists essentially of, or consists of: about 60 mol % to about 70 mol % $SiO_2$; about 6 mol % to about 14 mol % $Al_2O_3$; 0 mol % to about 15 mol % $B_2O_3$; 0 mol % to about 15 mol % $Li_2O$; 0 mol % to about 20 mol % $Na_2O$; 0 mol % to about 10 mol % $K_2O$; 0 mol % to about 8 mol % MgO; 0 mol % to about 10 mol % CaO; 0 mol % to about 5 mol % $ZrO_2$; 0 mol % to about 1 mol % $SnO_2$; 0 mol % to about 1 mol % $CeO_2$; less than about 50 ppm $As_2O_3$; and less than about 50 ppm $Sb_2O_3$; wherein 12 mol % ≤ $Li_2O+Na_2O+K_2O$ ≤ 20 mol % and 0 mol % ≤ MgO+CaO ≤ 10 mol %. In still another embodiment, the alkali aluminosilicate glass comprises, consists essentially of, or consists of: about 64 mol % to about 68 mol % $SiO_2$; about 12 mol % to about 16 mol % $Na_2O$; about 8 mol % to about 12 mol % $Al_2O_3$; 0 mol % to about 3 mol % $B_2O_3$; about 2 mol % to about 5 mol % $K_2O$; about 4 mol % to about 6 mol % MgO; and 0 mol % to about 5 mol % CaO, wherein: 66 mol % ≤ $SiO_2+B_2O_3+CaO$ ≤ 69 mol %; $Na_2O+K_2O+B_2O_3+MgO+CaO+SrO$ > 10 mol %; 5 mol % ≤ MgO+CaO+SrO ≤ 8 mol %; ($Na_2O+B_2O_3$)—$Al_2O_3$ ≤ 2 mol %; 2 mol % ≤ $Na_2O$—$Al_2O_3$ ≤ 6 mol %; and 4 mol % ≤ ($Na_2O+K_2O$)—$Al_2O_3$ ≤ 10 mol %.

In other embodiments, glass article 200 comprises $SiO_2$, $Al_2O_3$, $P_2O_5$, and at least one alkali metal oxide ($R_2O$), wherein $0.75 \le [(P_2O_5 \text{ (mol \%)} + R_2O \text{ (mol \%)})/M_2O_3 \text{ (mol \%)}] \le 1.3$, where $M_2O_3 = Al_2O_3 + B_2O_3$. In some embodiments, $[(P_2O_5 \text{ (mol \%)} + R_2O \text{ (mol \%)})/M_2O_3 \text{ (mol \%)}] = 1$ and, in some embodiments, the glass does not include $B_2O_3$ and $M_2O_3 = Al_2O_3$. The glass comprises, in some embodiments: about 40 to about 70 mol % $SiO_2$; 0 to about 28 mol % $B_2O_3$; about 0 to about 28 mol % $Al_2O_3$; about 1 to about 14 mol % $P_2O_5$; and about 12 to about 16 mol % $R_2O$. In some embodiments, the glass comprises, in some embodiments: about 40 to about 64 mol % $SiO_2$; 0 to about 8 mol % $B_2O_3$; about 16 to about 28 mol % $Al_2O_3$; about 2 to about 12 mol % $P_2O_5$; and about 12 to about 16 mol % $R_2O$. The glass may further comprise at least one alkaline earth metal oxide such as, but not limited to, MgO or CaO.

In some embodiments, the glass is free of lithium; i.e. the glass comprises less than 1 mol % $Li_2O$ and, in other embodiments, less that 0.1 mol % $Li_2O$. In some embodiments, such glasses are free of at least one of arsenic, antimony, and barium; i.e. the glass comprises less than 1 mol % and, in other embodiments, less that 0.1 mol % of $As_2O_3$, $Sb_2O_3$, and/or BaO. In some embodiments, the substrate is downdrawn, using methods such as, but not limited to fusion-drawing, slot-drawing, re-drawing, and the like.

In some embodiments, glass article 200 is either a three dimensional or flat planar glass sheet. Glass article 200 may, in some embodiments, have a thickness from about 0.2 mm up to about 4 mm; in some embodiments, up to about 1.2 mm; in other embodiments, up to about 1.0 mm; and, in still other embodiments, up to about 0.7 mm. Glass article 200 described herein may be used in applications such has, but not limited to: touch screens; protective cover glass for electronic devices such as a hand held communication or entertainment devices, information-related terminals, touch sensor devices, or the like; windshields, appliance enclosures; or architectural elements such as windows, panels, or the like.

A method of making a crack-resistant glass article, such as those described hereinabove, is also provided. A glass article is first provided. The glass article may comprise a soda lime glass, an alkali aluminosilicate glass, or an alkali aluminosilicate glass, such as those previously described herein. A first compressive stress is created in a core region (210 in FIGS. 2a, 3b, for example) of the glass article, a neutral or second compressive stress is created in an outer region (230a, 230b in FIGS. 2a, 3b, for example) extending from a surface of the glass article to a depth of layer, and a tensile stress is located in an intermediate region (220a, 220b in FIGS. 2a, 3b, for example) between the outer region and the core region. In some embodiments, the core region deflects cracks propagating through the intermediate layer to propagate laterally without changing their orientation with respect to the surface, and in some embodiments the core region deflects cracks propagating through the intermediate region and/or outer region by at least about 45° and, in some embodiments, by at least about 90°.

In some embodiments, the glass article that is provided comprises an alkali metal ion. In these instances the step of creating the compressive stress in the core region comprises exchanging the alkali metal ion in the outer region of the glass for a second alkali metal ion having an ionic radius that is larger than that of the alkali metal ion in the glass to the depth of layer so as to create a compressive stress in the outer region. In addition, the alkali metal ion in the intermediate region of the glass is exchanged with a third alkali metal ion having an ionic radius that is smaller than that of the alkali metal ion in the glass, thus creating a tensile stress in the intermediate region of the glass article. The creation of the tensile stress in the intermediate region gives rise to a compressive stress in the core region. In some embodiments, the ion exchange of the second alkali metal ion and the third alkali metal ion comprises exposing at least a portion of the glass article to a mixed alkali exchange bath or medium such as those previously described herein. The ion exchange bath or medium comprises the second alkali metal ion and the third alkali metal ion, wherein concentration of the second alkali metal ion in the ion exchange medium is greater than that of the third alkali metal ion in the ion exchange medium.

In some embodiments, the glass article provided is a glass laminate such as those previously described hereinabove. The glass laminate may comprise multiple glass sheets of like or different compositions. For example, the core region may comprise a first glass, the intermediate region may comprise a second glass, and the surface or outer region of the glass may comprise a third glass. Such laminates may be formed by contacting the multiple sheets with each other under temperature and pressure conditions that cause the sheets to fuse or otherwise bond together to form the laminate structure. In some embodiments, the individual glasses comprising the laminate differ in composition from each other. In some embodiments, at least a portion of the glasses comprising the laminate are ion exchangeable. In some embodiments the laminate may include glasses that are not ion exchangeable.

In some embodiments, the first glass and second glass that form the outer region and core region, respectively, have coefficients of thermal expansion (CTEs) that are less than that of the second glass that forms the intermediate region.

In other embodiments, compression may be achieved in the outer regions and the core region by a laminate structure in which a "core" glass containing a an alkali metal ion $m_a^+$ is laminated or encapsulated inside an outer layer or "skin" glass containing an alkali metal ion $m_b^+$ having an ionic radius that is less than that of $m_a^+$, as previously described hereinabove. In some embodiments, the larger and smaller alkali ions $m_a^+$, $m_b^+$ contained in the core glass and the skin glass respectively, may be chosen such that there is an intermediate size alkali metal ion $m_c^+$ having an ionic radius that is between those of larger and smaller alkali metal ions $m_a^+$, $m_b^+$; i.e., $m_a^+>m_c^+>m_b^+$. Possible combinations of alkali metal ions that satisfy this relationship and may therefore be used in this embodiment are listed in Table 1. The intermediate alkali metal ion $m_c^+$ will exchange with the smaller alkali ion $m_b^+$ in the skin glass to place the surfaces or skin glass in compression and thus form the outer regions of the glass. The intermediate alkali metal ion $m_c^+$ will also penetrate through the skin glass into a portion of the core glass and exchange with the larger alkali metal ion $m_a^+$ in the core glass to create the tensile intermediate regions. Penetration of alkali metal ion $m_c^+$ into the core glass can be controlled, for example, by limiting the time period allowed for ion exchange. The portion of the core glass in which such ion exchange does not occur will be put into compression so as to balance the stresses within the glass article thus creating the core region.

In another embodiment, both alkali metal ions $m_e^+$ and $m_f^+$ are larger than (i.e., each have ionic radii greater than) alkali metal ion $m_d^+$; i.e., $m_e^+>m_d^+$ and $m_f^+>m_d^+$. Here, the ionic radius of $m_e^+$ is either larger or equal to that of $m_f^+$ and the ionic radii of both $m_e^+$ and $m_f^+$ are both greater than that of $m_d^+$. Possible combinations of alkali metal ions that satisfy these conditions and may therefore be used in this embodiment are listed in Table 2. The laminate structure is ion-exchanged in an ion exchange bath or medium containing the alkali metal ion $m_f^+$. The alkali metal ion $m_f^+$ will exchange with the smaller alkali metal ion $m_e^+$ in the skin glass to place the surfaces of the glass in compression and thus form the outer regions of the glass. The alkali metal ion from the core $m_e^+$ will exchange with the alkali metal from the skin glass $m_d^+$ at the laminate interface to put the core glass at the interface into tension and the skin glass at the interface in compression. Penetration of alkali metal ion $m_f^+$ into the skin glass at the surface and penetration of the alkali metal $m_e^+$ from the core into the skin glass across the laminate interface can be controlled, for example, by limiting the time period allowed for ion exchange. This profile would consist of a skin with compression at the surfaces, at the laminate interfaces, and in the core, resulting in five compressive layers within the laminate. The portion of the core glass in which such ion exchange does not occur will be put into compression so as to balance the stresses within the glass article, thus creating the core region.

EXAMPLES

The following examples illustrate the advantages and features of the articles and methods described herein and are in no way intended to limit the disclosure and appended claims thereto.

The formation of alternating compressive and tensile layers in a glass samples by ion exchange in a mixed molten salt bath was investigated. Alkali aluminoborosilicate glass sheet samples, each having a thickness of 0.78 mm and comprising approximately 64 mol % $SiO_2$, 12.5 mol % $Al_2O_3$, 10 mol % $B_2O_3$, 12.5 mol % $Na_2O$ and 1 mol % $K_2O$, were used to study mixed bath ion-exchange. The salt bath compositions studied included 70 wt % $KNO_3$/30 wt % $LiNO_3$; 80 wt % $KNO_3$/20 wt % $LiNO_3$; 90 wt % $KNO_3$/10 wt % $LiNO_3$; and 95 wt % $KNO_3$/5 wt % $LiNO_3$. All glass samples were ion-exchanged in these salt baths at 410° C. for 8 hrs.

Samples that were ion exchanged in 70 wt % $KNO_3$/30 wt % $LiNO_3$ and 80 wt % $KNO_3$/20 wt % $LiNO_3$ molten salt baths salt cracked during the ion-exchange treatment. The cracking was most likely due to high surface tension during the ion exchange process. However, because the core was in compression, the cracks did not penetrate through the core of the glass. Instead, the cracks were deflected by the core propagated laterally rather than through the entire thickness of the glass.

Samples that were ion exchanged in the 90 wt % $KNO_3$/10 wt % $LiNO_3$ molten salt bath emerged from the ion exchange bath with surface cracks that initiated from the edges of the samples. These ion exchanged glasses each had a Vickers median/radial crack initiation threshold of 7000 gf, which is approximately seven times greater than that of the glass when it was not ion exchanged. The high Vickers indentation thresholds that were observed for these glass samples indicate that surface compression was achieved by the ion exchange process. No surface cracking was observed in samples that were ion-exchanged in the 90 wt % $KNO_3$/10 wt % $LiNO_3$ molten salt bath and had highly polished edges.

Figure 5:
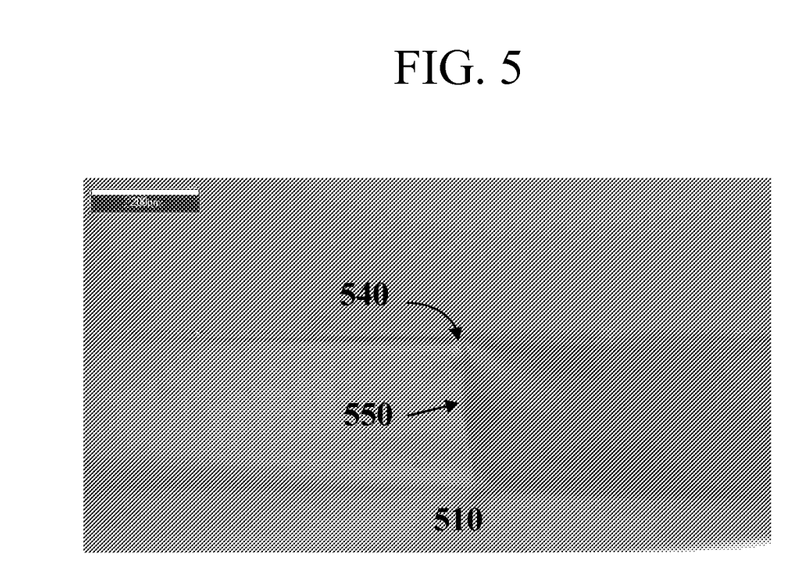
FIG. 5 is a micrograph of a cross-sectional view of a crack extending into a glass article and being deflected near the central compressive core region of the glass.

FIG. 5 is a micrograph of a cross-sectional view of a crack 550 extending from an indent 540 to a depth of about 290 μm into the glass before being deflected near the center of the glass (i.e., core region 510). The sample shown in FIG. 5 had been ion exchanged at 410° C. in a molten 90 wt % KNO$_3$/10 wt % LiNO$_3$ bath for 8 hours. Compressive core region 510 deflected the cracks so that they propagated laterally rather than through the center of the glass.

Figure 6:
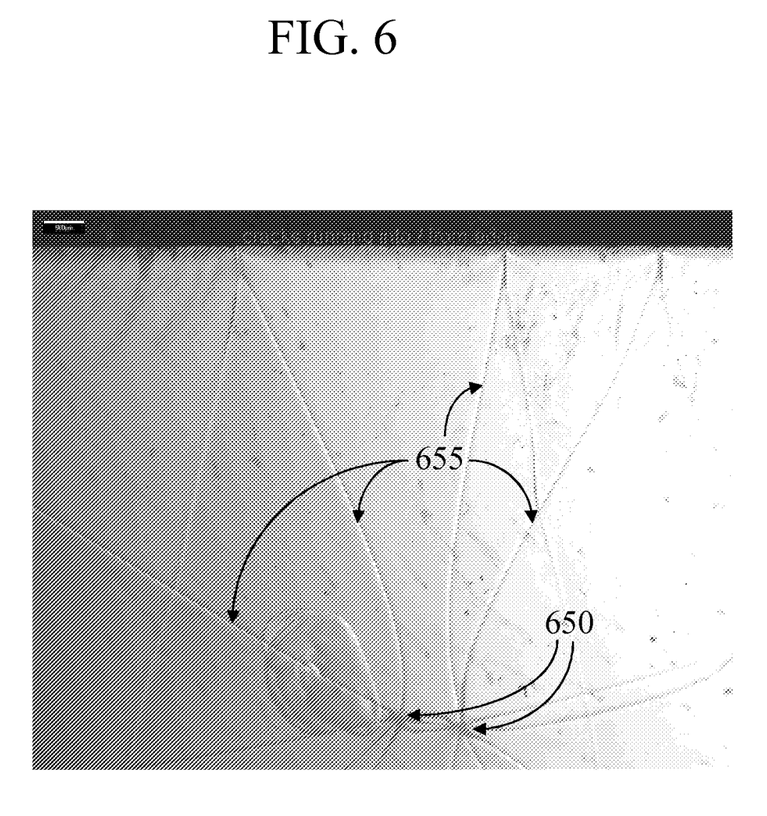
FIG. 6 is a micrograph of a top view of two Vickers indents in an ion exchanged glass sample.

FIG. 6 is a micrograph of a top view of two Vickers indents 650 made at indenter loads of 7000 gf and 10000 gf, respectively, in a glass sample that had been ion exchanged at 410° C. in a molten 90 wt % KNO$_3$/10 wt % LiNO$_3$ bath for 8 hours. Indent cracks 655 formed from these indents propagate laterally through the outer compressive region and the underlying tensile intermediate to a depth of about 290 μm, but did not penetrate the compressive core region of the glass. Cracks 655 extended to the edges of the glass where they encountered the roughened edge surfaces of the glass. Flaws that were present in the roughened edges enabled the cracks to wrap around the edge and to the opposite side of the glass and continue to propagate without penetrating through the compressive core region. Such propagation of cracks 655 to the opposite side of the glass sample could be avoided by polishing the edges of the sample. Propagation of the cracks through the entire thickness of the glass was blocked by the compressive core region.

Upon removal from the bath, no surface cracking was observed in samples that were ion exchanged at 410° C. for 8 hours in the 95 wt % KNO$_3$/5 wt % LiNO$_3$ molten salt bath. Surface compression was achieved in these samples, as evidenced by the Vickers indentation threshold of 7000 gf. Ring-on-ring load to failure testing was performed on non-abraded 50 mm×50 mm×0.7 mm thick samples with a 1 inch diameter support ring and a ½ inch diameter loading ring. The sample was placed on the support ring, and the load was applied at a rate of 1.2 mm/min. Testing was performed at room temperature in 50% relative humidity, and the radius of curvature on the rings was 1/16 inch. The ring-on-ring testing of the non-abraded samples gave a load of failure of 169±6 kgf (kilogram force). At indentation loads of greater than or equal to 7000 gf, cracks ran laterally across the surface of the glass but did not penetrate the compression core.

By replacing the KNO$_3$ salt in the ion exchange bath with NaNO$_3$, the compressive stress in the surface or outer region of the glass article should be greatly reduced, while the amount of underlying tension in the intermediate region and the balance of compression in the core region should increase. Accordingly, glass samples, the composition of which is described hereinabove, were ion exchanged for 8 hours at 410° C. in molten baths containing lithium and sodium salts. Molten salt baths containing either 90 wt % NaNO$_3$/10 wt % LiNO$_3$ or 95 wt % NaNO$_3$ 5 wt % LiNO$_3$ were used. The ion exchanged glasses exhibited Vickers indentation thresholds of about 300 gf, indicating that the surface/outer region of the glass was not under compression. Since the crack threshold of the ion-exchanged glass was lower than the non-ion-exchanged glass, the surface either had neutral stress or was slightly in tension. The core compression was enhanced and caused crack deflection, as evidenced by the curvature of cracks as they approached the compressive core region in the center of the glass.

In another example, the formation of alternating compressive and tensile layers in a glass samples by ion exchange in a mixed molten salt bath was investigated in another glass composition. Alkali aluminoborosilicate glass samples, having thicknesses of 0.65 and 1 mm and comprising approximately 69 mol % SiO$_2$, 9 mol % Al$_2$O$_3$, 1 mol % CaO, 6 mol % MgO, 14 mol % Na$_2$O and 1 mol % K$_2$O, were used to study mixed bath ion-exchange. Samples were ion exchanged at 410° C. for 8 hours in the 99 wt % KNO$_3$/1 wt % LiNO$_3$ molten salt bath. Upon removal from the bath, no surface cracking was observed. Vickers indentation of the glass surface for the 1 mm thick sample was made at indenter loads of 5000 gf. Indentation cracks formed from these indents propagate laterally through the outer compressive region and the underlying tensile intermediate to a depth of about 230 μm, but did not penetrate the compressive core region of the glass. Interferometry measurements on the 0.65 mm thick ion exchanged glass samples showed a profile schematically represented in FIG. 4, having a surface compression at surfaces 235a and 235b of about 390 MPa with a depth of the outer compression layer $d_{a1}$ and $d_{b1}$ of about 30 μm followed by a tension layer in intermediate regions 220a and 220b with a maximum tension of about 70 MPa and width of about 140 μm ($d_{a1}$ and $d_{b1}$ at about 170 μm) followed by a central compression layer 210 having a maximum compression of about 10 MPa and a width of about 310 μm. Thus the glass sample had a central compression layer that was about 80 MPa in compression relative to the maximum tension in the tension layer.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A glass article, the glass article comprising:
   a. an outer region extending from the surface to a depth of layer, wherein the outer region is under neutral stress or a first compressive stress;
   b. a core region under a second compressive stress, the core region including a mid-point between the surface and a second surface opposite the surface of the glass article; and
   c. an intermediate region disposed between the surface and the core region, wherein the intermediate region is under a tensile stress.

2. The glass article of claim 1, wherein the outer region is under the first compressive stress.

3. The glass article of claim 2, wherein the depth of layer of the outer region is at least 5 μm.

4. The glass article of claim 2, wherein the first compressive stress is at least 500 MPa.

5. The glass article of claim 2, wherein the glass article has a laminate structure.

6. The glass article of claim 5, wherein:
   a. the core region comprises a first glass having a first coefficient of thermal expansion;
   b. the intermediate region comprises a second glass having a second coefficient of thermal expansion; and
   c. the outer region comprises a third glass having a third coefficient of expansion, and wherein the first coefficient of expansion and third coefficient of thermal expansion are less than the second coefficient of thermal expansion.

7. The glass article of claim 5, wherein:
   a. the core region comprises a core glass, the core glass comprising a first alkali metal ion;
   b. the intermediate region comprises the core glass and a second alkali metal ion that is smaller than the first alkali metal ion; and c. the outer region comprises a skin glass, the skin glass comprising a third alkali metal ion, wherein the third alkali metal ion is larger than the second alkali metal ion.

8. The glass article of claim 7, wherein the second alkali metal ion has a composition profile C(z) described by a complementary error function based on a concentration C of the second alkali metal ion, distance z from the outer surface, a minimum bulk concentration $C_{min}$ of the second alkali metal ion, and a maximum surface concentration of the second alkali metal ion $C_{surf}$, where $C(z)=C_{min}+(C_{surf}-C_{min})\cdot erfc(z/A)$, where A is a constant.

9. The glass article of claim 1, wherein the glass article has a Vickers crack initiation threshold of at least 5000 gf.

10. The glass article of claim 1, wherein the glass article is ion exchanged.

11. The glass article of claim 1, wherein the glass article comprises an alkali aluminosilicate glass or an alkali aluminoborosilicate glass.

12. The glass article of claim 11, where the alkali aluminosilicate glass comprises: 61-75 mol % $SiO_2$; 7-15 mol % $Al_2O_3$; 0-12 mol % $B_2O_3$; 9-21 mol % $Na_2O$; 0-4 mol % $K_2O$; 0-7 mol % MgO; and 0-3 mol % CaO.

13. The glass article of claim 11, where the alkali aluminosilicate glass comprises: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-8 mol % MgO; 0-10 mol % CaO; 0-5 mol % $ZrO_2$; 0-1 mol % $SnO_2$; 0-1 mol % $CeO_2$; less than 50 ppm $As_2O_3$; and less than 50 ppm $Sb_2O_3$; and wherein 12 mol %≤$Li_2O+Na_2O+K_2O$≤20 mol % and 0 mol %≤MgO+CaO≤10 mol %.

14. The glass article of claim 11, where the alkali aluminoborosilicate glass comprises: greater than 50 mol % $SiO_2$, and wherein the ratio $$\frac{Al_2O_3(mol\ \%)+B_2O_3(mol\ \%)}{\sum alkali\ metal\ modifiers\ (mol\ \%)}>1,$$

where the alkali metal modifiers are alkali metal oxides.

15. The glass article of claim 1, wherein the glass article comprises $SiO_2$, $Al_2O_3$, $P_2O_5$, and at least one alkali metal oxide ($R_2O$), wherein $0.75\leq[(P_2O_5(mol\ \%)+R_2O(mol\ \%))/M_2O_3(mol\ \%)]\leq1.2$, where $M_2O_3=Al_2O_3+B_2O_3$.

16. The glass article of claim 1, wherein the glass article is a planar sheet.

17. The glass article of claim 16, wherein the planar sheet has a thickness of up to 1.2 mm.

18. The glass article of claim 1, wherein the core region deflects cracks propagating through the intermediate layer by at least 45°.

19. The glass article of claim 1, wherein the glass article forms at least a portion of: a touch screen; a protective cover glass for a hand held electronic device; an information-related terminal, or a touch sensor device; a windshield; an appliance enclosure; or an architectural panel.

20. A method of making a crack-resistant glass article as claimed in claim 1, the method comprising the steps of:
a. providing a glass article, the glass article having a core region, the core region encompassing a mid-point of the glass article, a surface region, and an intermediate region disposed between the surface region and the core region; and
b. creating a compressive stress in the core region and a tensile stress in the intermediate region, wherein the compressive stress at least partially blocks propagation of cracks from the intermediate region through the core region.

21. The method of claim 20, wherein the step of providing a glass article comprises providing a glass article comprising an alkali metal ion, and wherein the step of creating a compressive stress in the core region and a tensile stress in the intermediate region comprises:
a. exchanging the alkali metal ion in the glass with a second alkali metal ion that is larger than the alkali metal ion in the glass in a region extending from the surface to a depth of layer, wherein the exchange creates a compressive stress in the surface region; and
b. exchanging the alkali metal ion in the intermediate region of the glass with a third alkali metal ion that is smaller than the alkali metal ion in the glass, wherein the exchange of the third alkali metal ion for the alkali metal ion creates a tensile stress in the intermediate region, and wherein the tensile stress in the intermediate region creates a compressive stress in the core region.

22. The method of claim 21, wherein the steps of exchanging the alkali metal ion in the glass with the second alkali metal ion and the third alkali metal ion comprise exposing the glass article to an ion exchange medium, the ion exchange medium comprising the second alkali metal ion and the third alkali metal ion, wherein the second alkali metal is present in the ion exchange medium in a concentration ion that is greater than that of the third alkali metal ion.

23. The method of claim 20, wherein the step of providing the glass article comprises providing a glass laminate, wherein the core region of the glass laminate comprises a core glass and the surface region comprises a skin glass.

24. The method of claim 23, wherein, the intermediate region comprises an intermediate glass, and wherein the core glass and the skin glass each have a coefficient of thermal expansion that is less than a coefficient of thermal expansion of the intermediate glass.

25. The method of claim 23, wherein the core glass comprises a first alkali metal ion and the skin glass comprises a third alkali metal ion, wherein the first alkali metal ion is larger than the third alkali metal ion, and wherein the step of creating a compressive stress in the core region and a tensile stress in the intermediate region comprises:
a. providing an ion exchange medium comprising a second alkali metal ion;
b. exchanging the second alkali metal ion in the ion exchange medium for the third alkali metal ion in the skin glass to create a compressive stress in the surface region; and
c. exchanging the second alkali metal ion in the ion exchange medium for the first alkali metal ion in a portion of the core glass adjacent to the surface region to form the intermediate region and to create a compressive stress in the core region and a tensile stress in the intermediate region.

26. The method of claim 25, wherein the second alkali metal ion is larger than the third alkali metal ion and smaller than the first alkali metal ion.

27. The method of claim 20, wherein the core region deflects cracks propagating through the intermediate layer by at least 45°.

28. A glass article, the glass article having a laminate structure, wherein the laminate structure comprises:
an outer region extending from a surface of the glass article to a depth of layer, wherein the outer region is under neutral stress or a first compressive stress;

a core region under a second compressive stress, the core region including a mid-point between the surface and a second surface opposite the surface of the glass article; and an intermediate region disposed between the outer region and the core region, wherein the intermediate region is under a tensile stress.

29. The glass article of claim 28, wherein:
the core region comprises a first glass having a first coefficient of thermal expansion;
the intermediate region comprises a second glass having a second coefficient of thermal expansion; and
the outer region comprises a third glass having a third coefficient of expansion, and wherein the first coefficient of expansion and third coefficient of thermal expansion are less than the second coefficient of thermal expansion.

30. The glass article of claim 29, wherein:
the core region comprises a core glass, the core glass comprising a first alkali metal ion;
the intermediate region comprises the core glass and a second alkali metal ion; and
the outer region comprises a skin glass, the skin glass comprising a third alkali metal ion, wherein the third alkali metal ion is larger than the second alkali metal ion.

31. The glass article of claim 30, wherein the second alkali metal ion is smaller than the first alkali metal ion.

32. The glass article of claim 30, wherein the outer region comprises an alkali aluminosilicate glass containing sodium and the core region comprises an alkali aluminosilicate glass comprising an alkali metal that is larger than sodium.

33. The glass article of claim 28, wherein the glass article has a Vickers crack initiation threshold of at least about 5000 gf.

34. The glass article of claim 28, wherein the depth of layer of the outer region is at least about 5 μm.

35. The glass article of claim 33, wherein the outer region has a compressive stress of at least 500 MPa.

36. The glass article of claim 28, wherein the glass article comprises an alkali aluminosilicate glass or an alkali aluminoborosilicate glass.

37. The glass article of claim 36, where the alkali aluminosilicate glass comprises: 61-75 mol % $SiO_2$; 7-15 mol % $Al_2O_3$; 0-12 mol % $B_2O_3$; 9-21 mol % $Na_2O$; 0-4 mol % $K_2O$; 0-7 mol %≤MgO; and 0-3 mol %≤CaO.

38. The glass article of claim 36, where the alkali aluminosilicate glass comprises: 60-70 mol % $SiO_2$; 6-14 mol % $Al_2O_3$; 0-15 mol % $B_2O_3$; 0-15 mol % $Li_2O$; 0-20 mol % $Na_2O$; 0-10 mol % $K_2O$; 0-8 mol % MgO; 0-10 mol % CaO; 0-5 mol % $ZrO_2$; 0-1 mol % $SnO_2$; 0-1 mol % $CeO_2$; less than 50 ppm $As_2O_3$; and less than 50 ppm $Sb_2O_3$; and wherein 12 mol %≤$Li_2O+Na_2O+K_2O$≤20 mol % and 0 mol %≤MgO+CaO≤10 mol %.

39. The glass article of claim 36, where the alkali aluminoborosilicate glass comprises: greater than 50 mol % $SiO_2$, and wherein the ratio $$\frac{Al_2O_3(mol\ \%) + B_2O_3(mol\ \%)}{\sum alkali\ metal\ modifiers\ (mol\ \%)} > 1,$$

where the alkali metal modifiers are alkali metal oxides.

40. The glass article of claim 28, wherein the glass article comprises $SiO_2$, $Al_2O_3$, $P_2O_5$, and at least one alkali metal oxide ($R_2O$), wherein $0.75 \leq [(P_2O_5(mol\ \%)+R_2O(mol\ \%))/M_2O_3\ (mol\ \%)] \leq 1.2$, where $M_2O_3=Al_2O_3+B_2O_3$.

41. The glass article of claim 28, wherein the glass article is a planar sheet.

42. The glass article of claim 40, wherein the planar sheet has a thickness of up to about 1.2 mm.

43. The glass article of claim 28, wherein the core region deflects cracks propagating through the intermediate layer by at least 45°.

44. The glass article of claim 28, wherein the glass article forms at least a portion of: a touch screen; a protective cover glass for a hand held electronic device; an information-related terminal, or a touch sensor device; a windshield; an appliance enclosure; or an architectural panel.

45. The glass article of claim 30, wherein the second alkali metal ion has a composition profile C(z) described by a complementary error function based on a concentration C of the second alkali metal ion, distance z from the outer surface, a minimum bulk concentration $C_{min}$ of the second alkali metal ion, and a maximum surface concentration of the second alkali metal ion $C_{surf}$, where $C(z)=C_{min}+(C_{surf}-C_{min})\cdot erfc(z/A)$, where A is a constant.

46. A glass article, the glass article comprising:
an outer region extending from the surface to a depth of layer of at least 5 μm, wherein the outer region is under a first compressive stress of at least 500 MPa;
a core region under a second compressive stress; and
an intermediate region disposed between the surface and the core region, wherein the intermediate region is under a tensile stress.

47. The glass article of claim 46, wherein the glass article has a laminate structure.

48. The glass article of claim 47, wherein:
a. the core region comprises a first glass having a first coefficient of thermal expansion;
b. the intermediate region comprises a second glass having a second coefficient of thermal expansion; and
c. the outer region comprises a third glass having a third coefficient of expansion, and wherein the first coefficient of expansion and third coefficient of thermal expansion are less than the second coefficient of thermal expansion.

49. The glass article of claim 46, wherein:
the core region comprises a core glass, the core glass comprising a first alkali metal ion;
the intermediate region comprises the core glass and a second alkali metal ion that is smaller than the first alkali metal ion; and
the outer region comprises a skin glass, the skin glass comprising a third alkali metal ion, wherein the third alkali metal ion is larger than the second alkali metal ion.

50. The glass article of claim 49, wherein the second alkali metal ion has a composition profile C(z) described by a complementary error function based on a concentration C of the second alkali metal ion, distance z from the outer surface, a minimum bulk concentration $C_{min}$ of the second alkali metal ion, and a maximum surface concentration of the second alkali metal ion $C_{surf}$, where $C(z)=C_{min}+(C_{surf}-C_{min})\cdot erfc(z/A)$, where A is a constant.

51. The glass article of claim 46, wherein the glass article has a Vickers crack initiation threshold of at least 5000 gf.

52. The glass article of claim 46, wherein the glass article is ion exchanged.

53. The glass article of claim 46, wherein the glass article comprises an alkali aluminosilicate glass or an alkali aluminoborosilicate glass.

54. A glass article, the glass article having a laminate structure, wherein the laminate structure comprises:

an outer region extending from a surface of the glass article to a depth of layer, the outer region comprising a skin glass, the skin glass comprising a first alkali metal ion, wherein the outer region is under neutral stress or a first compressive stress;

a core region comprising a core glass under a second compressive stress, the core glass comprising a second alkali metal ion; and an intermediate region disposed between the outer region and the core region, the intermediate region being under a tensile stress and comprising the core glass and a third alkali metal ion, wherein the first alkali metal ion is larger than the third alkali metal ion.

55. The glass article of claim 54, wherein:

the core region comprises a first glass having a first coefficient of thermal expansion;

the intermediate region comprises a second glass having a second coefficient of thermal expansion; and the outer region comprises a third glass having a third coefficient of expansion, and wherein the first coefficient of expansion and third coefficient of thermal expansion are less than the second coefficient of thermal expansion.

56. The glass article of claim 54, wherein the glass article has a Vickers crack initiation threshold of at least about 5000 gf.

57. The glass article of claim 54, wherein the depth of layer of the outer region is at least about 5 μm.

58. The glass article of claim 54, wherein the outer region has a compressive stress of at least 500 MPa.

59. The glass article of claim 54, wherein the glass article comprises an alkali aluminosilicate glass or an alkali aluminoborosilicate glass.

60. The glass article of claim 54, wherein the third alkali metal ion has a composition profile $C(z)$ described by a complementary error function based on a concentration C of the second alkali metal ion, distance z from the outer surface, a minimum bulk concentration $C_{min}$ of the third alkali metal ion, and a maximum surface concentration of the third alkali metal ion $C_{surf}$, where $C(z)=C_{min}+(C_{surf}-C_{min})\cdot \mathrm{erfc}(z/A)$, where A is a constant.

* * * * *